United States Patent [19]

Euler et al.

[11] 4,226,319
[45] Oct. 7, 1980

[54] HYDRAULIC CLUTCH

[75] Inventors: John W. Euler; Arthur W. Pear, both of Benton Harbor, Mich.

[73] Assignee: Lambert Brake Corporation, St. Joseph, Mich.

[21] Appl. No.: 957,973

[22] Filed: Nov. 6, 1978

[51] Int. Cl.³ ............................................. F16D 25/08
[52] U.S. Cl. ............................ 192/85 CA; 192/109 R
[58] Field of Search .......... 192/85 AA, 85 AB, 85 A, 192/85 R, 70.11, 70.21, 109 R, 109 A, 85 C, 85 CA

[56] References Cited

U.S. PATENT DOCUMENTS

| | | | |
|---|---|---|---|
| 2,495,988 | 1/1950 | Sheppard | 192/85 AA |
| 2,766,864 | 10/1956 | Schilling et al. | 192/85 AA |
| 2,837,192 | 6/1958 | Dunkelow | 192/85 AA |
| 3,335,836 | 8/1967 | Swanson | 192/85 R |

Primary Examiner—George H. Krizmanich
Attorney, Agent, or Firm—Trexler, Wolters, Bushnell & Fosse, Ltd.

[57] ABSTRACT

An hydraulic clutch comprises coaxial input and output shafts with driving and driven discs respectively mounted on the shafts. The mounting of the driven discs on the output shaft includes a one piece member having a cup with an annular wall that surrounds the input shaft and the driving discs. The one piece member also includes the output shaft. An hydraulic piston is used to engage the clutch discs; and pins, around which return springs are mounted, limit the throw of the piston. The arrangement tends to minimize turbulence, heat build-up, and power losses when the clutch is in the disengaged condition.

8 Claims, 3 Drawing Figures

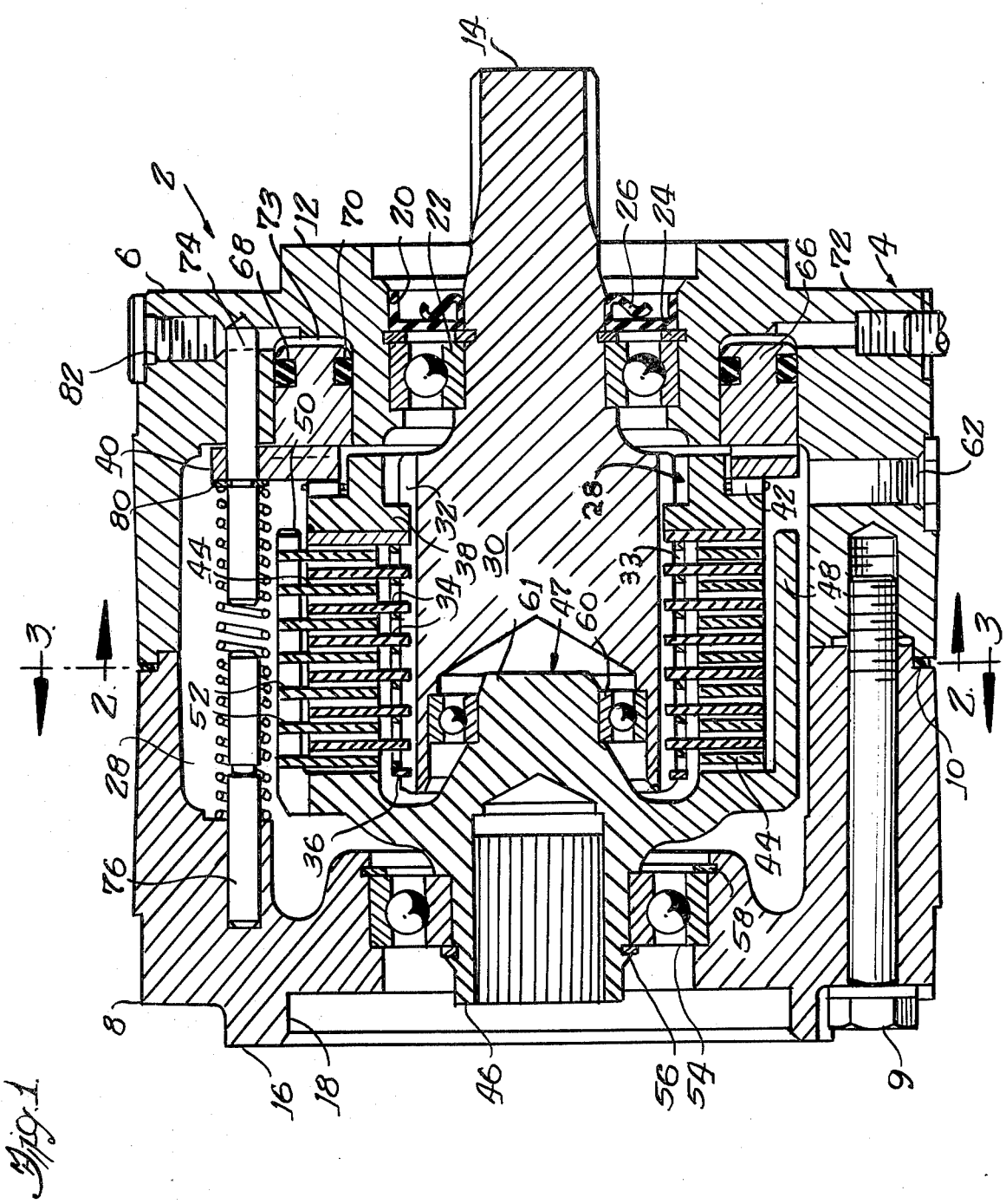

HYDRAULIC CLUTCH

BACKGROUND OF THE INVENTION

This invention relates to clutches of the so called hydraulic type, namely wherein the clutch plates are exposed to a lubricating fluid.

In clutches of the foregoing type it is desirable to minimize turbulence at such times as the clutch is in the disengaged condition. Under such conditions the input shaft is rotating while the output shaft is stationary. The continued rotation of the driving discs and other parts within the clutch housing tend to create turbulence, resulting in a build-up of heat and power losses. Naturally, such losses should be kept to a minimum for efficient operation of the equipment of which the clutch is a part.

SUMMARY OF THE INVENTION

A principle object of this invention is to provide a clutch in which the amount of turbulence, power losses and heat build-up is minimized.

More particularly it is an object of this invention to provide a clutch in which the drive plates or discs are keyed directly to the input shaft and the driven plates or discs are keyed to the annular wall of a cup member, an end of which integrally includes the output shaft. Thus, the cup and the output shaft may be cast as a one piece unit to reduce costs. When the clutch is disengaged the one piece cup and the output shaft cease rotation while the input shaft and drive discs continue to rotate. However, turbulence within the oil filled clutch housing is minimized. The reason for this lies in the fact that the drive discs are relatively smooth and are of uniform diameter as distinguished from a large cup, skirt or cage of the prior art, which is of relatively large diameter and has slots, cavities and various types of uneven edges which would create turbulence. Wave springs between the drive discs provide maximum running clearance for minimum heat build up.

In accordance with the foregoing objects the hydraulic clutch comprises coaxial input and output shafts, driving and driven clutch discs respectively coupled to the input and output shafts, means including a piston for drivingly engaging the disc, the coupling of said driven discs to said output shaft including a one piece member that has a portion that surrounds the input shaft and on which the driven discs are mounted, said one piece member also having the output shaft at one end thereof, and a housing forming a chamber containing the driven and driving discs plus a part of the input shaft.

A piston is movable in one direction for applying axial force to the driving and driven discs for drivingly coupling the input and output shafts. A first pin is carried by the piston and a second pin is in axially spaced relation to the first pin and constitutes a stop abutment that limits the throw or movement of the piston in one direction. A return spring surrounds the pins for applying retracting force to the piston.

BRIEF DESCRIPTION OF THE FIGURES

FIG. 1 is a sectional view taken approximately along line 1—1 of FIG. 2;

DETAILED DESCRIPTION

Figure 3:
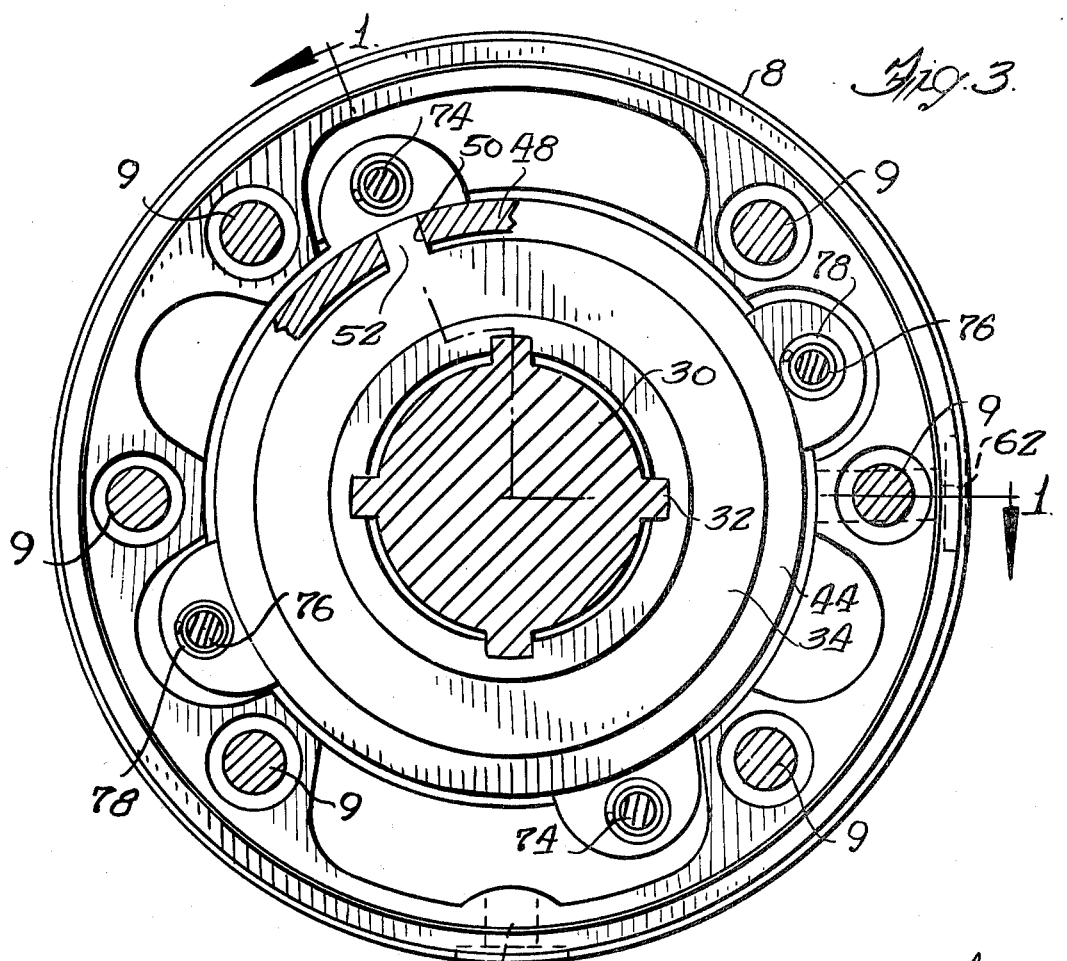
FIG. 3 is a partial sectional view taken along line 3—3 of FIG. 1 and with some parts omitted.
Figure 2:
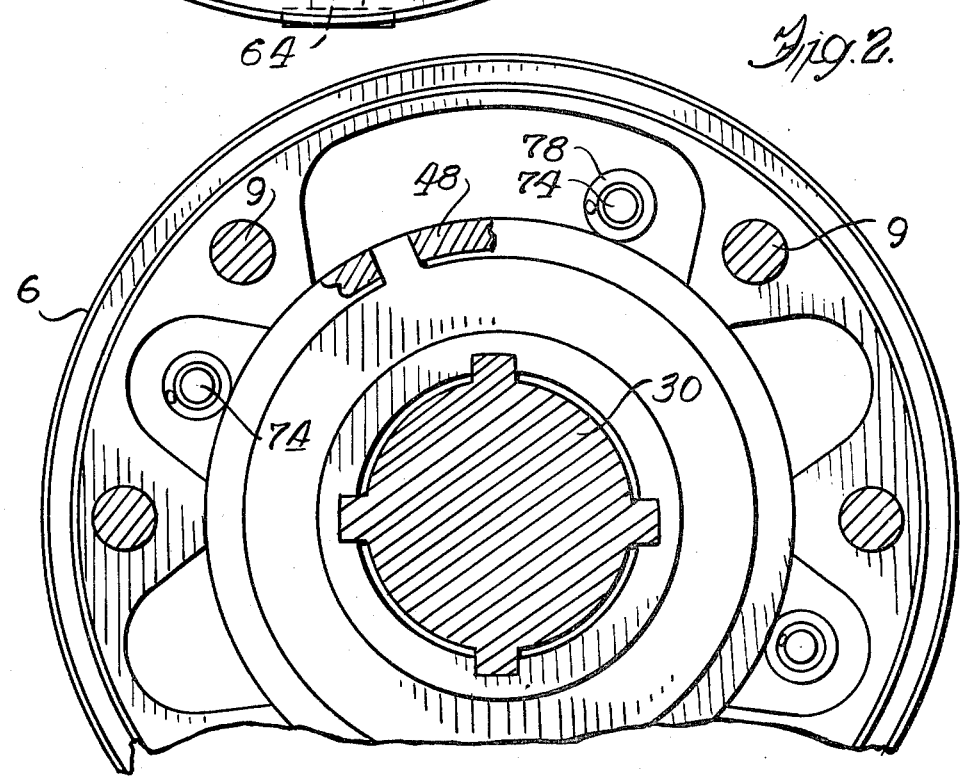
FIG. 2 is a sectional view taken along line 2—2 of FIG. 1 with some parts omitted.

Referring now in more detail to the drawing there is shown a hydraulic clutch 2 having a housing 4 that is made up of two sections 6,8 that are joined together by bolts 9. The junction 10 between the sections 6,8 is sealed by a suitable gasket. The housing thus provided includes an input end 12 having an externally splined input shaft 14 projecting therefrom in the usual manner. The output end 16 includes a cavity or recess 18 at which the output end 16 may be sealed through the use of an O-ring or gasket (not shonw) to a transmission or like structure to be driven so that the transmission and the clutch may have a common oil circulatory system.

The opening 20 at the input end includes a bearing 22 that journals the input shaft 14. The bearing 22 is held in place by a retainer ring 24. On the outside of the retainer 24 and pressed thereagainst is an oil seal 26 which serves to seal the input end of the housing from leakage of oil outwardly from the interior of the housing 4.

Within the housing is a chamber 28 which is adapted to contain oil, such as a conventional automatic transmission fluid. Within the chamber 28 the input shaft 14 has an enlargement or hub 30, the outer periphery of which has axial splines 32. Mounted for axially sliding movement along the splines 32 is a number of clutch plates or driving discs 34 which radiate outwardly from the splines 32. The discs 34 thus rotate with the input shaft 14 and have limited axial movement thereon. Wave springs 33 between the discs 34 provide maximum running clearances when the clutch is disengaged, and heat build up within the clutch is thus minimized. At one end the hub 30 is provided with an annular retaining ring 36. A backing 38 is slidably mounted on the splines 32 at the end of the hub 30 opposite to the retaining ring 36. For applying axial force to the backing 38 a slidable but non-rotatable thrust plate 40 is provided, and interposed between the thrust plate 40 and the backing 38 is a roller bearing 42 so that the backing may rotate relative to the thrust plate 40.

The clutch also has a number of axially spaced driven plates or discs 44 which are disposed in alternating parallel relationship with the driving discs 34. A one piece casting is provided to mount the driving discs 44 and the internally splined output shaft 46. This casting, generally designated at 47, is cup shaped and includes an annular skirt or wall 48 having an open end presented toward the inut end 12 and which receives coaxially the driving discs 34 and part of the input shaft hub 30. At the opposite end of the casting 47 is the output shaft 46, which is also disposed coaxial with the input shaft 14. The skirt or wall 48 has a plurality of circumferentially spaced slots or recesses 50 for receiving radial extension 52 on the driven discs 44. Thus, the driven discs 44 are drivingly coupled to the casting 47 through the wall 48 but are nevertheless axially moveable to a limited extent along the wall 48.

A bearing 54 is mounted on the output shaft 46, the bearing being held by retaining rings 56,58. Within the chamber 28 the input and output shafts 14,46 are provided with a common bearing 60, the inner race of which is fixed to an output shaft bearing seat 61 and the outer race of which is fixed to the input shaft hub 30.

The housing 6 has a fill hole 62 which may be closed by any suitable threaded plug. As shown in FIG. 3, the normally down side of the housing has an outlet hole 64, which also may be closed by a suitable plug.Provided for actuating the thrust plate 40 is an annular piston 66 which is sealed in its annular chamber or cylinder 73 by outer and inner O-rings 68,70. The piston 66 moves coaxially of the input and output shafts. A pressure inlet 72 is connected to a suitable source of oil under pressure so that upon admission of fluid into the inlet 72, the piston chamber 73 is pressurized and the piston 66 moves to the left, reference being made to FIG. 1. A bleed screw 82 may also be provided for bleeding oil from the piston chamber 73.

Outward of the annular wall 48 is a series of sets of pins, there being a first pin 74 and a second pin 76 for each set. The pin 74 is mounted in the housing sections 6 and is coaxial with the pin 76, both pins being parallel to the axis of the input and output shafts. The pins 76 are suitably pressed into the housing section 8. Surrounding each pair of pins 74,76 is a return spring 78 of the coil-compression type. The pin 74 also carries a retaining ring 80 adjacent to the thrust plate 40.

In the absence of fluid under pressure in the pressure inlet 72 the clutch is in the disengaged condition, at which time the input shaft 14 is rotating on bearing 60,22 while the output shaft 46 and the parts rotatable therewith are stationary. The relatively smooth driving discs 34 and the input shaft 14 produce relatively low turbulence, drag and heat build-up. When fluid under pressure is admitted into the piston chamber 73 from the pressure inlet 72, the piston 66 moves to the left thereby pushing the thrust plate 40, mounted on pins 74, against the roller bearing 42 which, in turn, applies pressure against the backing 38. As the backing 38 moves to the left a sufficient amount the driving and the driven discs will drivingly engage causing the output shaft 46 to rotate. The actual throw of the piston 66 will be limited by the axial spacing of the pins 74, 76, which serves to prevent the piston 66 from over travelling. Upon release of pressure from the side of the piston that is exposed to the inlet 72, return springs 78 move the piston back to the right, thereby disengaging the driving and driven discs 34,44.

The invention is claimed as follows:

1. An hydraulic clutch comprising an input shaft, driving discs radiating outwardly from said shaft, and means mounting said driving discs on said input shaft for rotation therewith and for limited axial sliding movement therealong; a cup having an open end for receiving said input shaft, said cup having an annular wall surrounding a plurality of said driving discs, and cup also including an end opposite to said open end and shaped to form an output shaft coaxial with said input shaft, driven discs radiating inwardly from said annular walls and being disposed in alternating parallel relation with the driving discs, and means mounting said driven discs on said annular wall for rotation therewith and for limited axial sliding movement therealong; piston means for applying sufficient axial pressure to said driving and driven discs to couple them and thereby drivingly couple the input and output shafts, and means forming a chamber for containing hydraulic fluid and in which said annular wall and said driving and driven discs are located, a first pin, and thrust plate means carrying said first pin for axial, non-rotational motion and interposed between said driving and driven discs and said piston means, said first pin having an effective length sufficient to engage a stop member and thus limit the axial pressure imposed by the piston means through the thrust plate means on the driving and driven discs.

2. An hydraulic clutch according to claim 1 in which said cup and said output shaft are formed of a one piece member.

3. An hydraulic clutch according to claim 1 or claim 2 in which the input shaft has a hub portion with splines that receive the radially inner ends of the driving discs, and the annular wall has recesses for receiving the outer radial ends of said driven discs.

4. An hydraulic clutch comprising an input shaft, driving discs mounted for rotation on said input shaft and for axial sliding movement therealong, a driven member including an output shaft coaxial with the input shaft and a structure surrounding said driving discs, driven discs mounted on said structure for rotation therewith and for axial sliding therealong, means for drivingly coupling said input and output shafts including a piston movable in one direction for applying axial force to said driving and driven discs, a first pin having a first effective length and carried for movement with said piston, a second pin having a second effective length located in axially spaced relation to said first pin and constituting a stop abutment, the pin effective lengths together limiting the movement of the piston in said one direction and the consequent pressure exerted upon the driving discs and driven discs, and a return spring surrounding said pins for applying force to the piston to move it in a direction that is opposite to said one direction.

5. An hydraulic clutch according to claim 4 including a thrust plate means interposed between said piston and said driving and driven discs and carrying said first pin in said axial alignment with said second pin.

6. An hydraulic clutch according to claim 5 including housing means mounting said piston, and wherein said first pin extends through said thrust plate means to permit translational, non-rotational movement of said pin and thrust plate means relative to said housing.

7. An hydraulic clutch according to claim 1 including a second pin axially aligned with said first pin to act as said stop member.

8. An hydraulic clutch according to claim 7 including spring return means surrounding said first pin and said second pin for applying force to said thrust plate means in a direction to uncouple said driving and driven discs.

* * * * *